United States Patent
Papirakis et al.

(10) Patent No.: US 11,616,716 B1
(45) Date of Patent: Mar. 28, 2023

(54) CONNECTION OWNERSHIP GOSSIP FOR NETWORK PACKET RE-ROUTING

(71) Applicant: Amazon Technologies, Inc., Seattle, WA (US)

(72) Inventors: Emmanuel Papirakis, Bothell, WA (US); Jorge Peixoto Vasquez, Mercer Island, WA (US); Yashwanth Yadavalli, Seattle, WA (US); Yuchao Li, Seattle, WA (US); Mohit Mohanan, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/548,263

(22) Filed: Dec. 10, 2021

(51) Int. Cl.
| | |
|---|---|
| G06F 15/173 | (2006.01) |
| H04L 45/16 | (2022.01) |
| H04L 45/42 | (2022.01) |
| H04L 12/46 | (2006.01) |
| H04L 45/745 | (2022.01) |
| H04L 45/00 | (2022.01) |
| H04L 101/622 | (2022.01) |

(52) U.S. Cl.
CPC .......... H04L 45/16 (2013.01); H04L 12/4633 (2013.01); H04L 45/22 (2013.01); H04L 45/42 (2013.01); H04L 45/745 (2013.01); H04L 2101/622 (2022.05)

(58) Field of Classification Search
None
See application file for complete search history.

(56) References Cited

U.S. PATENT DOCUMENTS

| | | | | |
|---|---|---|---|---|
| 10,305,758 | B1 * | 5/2019 | Bhide | G06F 11/3466 |
| 10,701,167 | B1 * | 6/2020 | Kuo | H04L 67/12809 |
| | | | | 709/217 |
| 2008/0285436 | A1 * | 11/2008 | Robinson | H04L 45/00 |
| | | | | 714/2 |
| 2009/0116484 | A1 * | 5/2009 | Buford | H04L 67/104 |
| | | | | 370/392 |
| 2009/0248800 | A1 * | 10/2009 | Chu | H04L 65/1104 |
| | | | | 709/204 |

(Continued)

FOREIGN PATENT DOCUMENTS

CN 104881422 A * 9/2015 ............ G06F 16/00

*Primary Examiner* — Phyllis A Book
(74) *Attorney, Agent, or Firm* — Klarquist Sparkman, LLP

(57) ABSTRACT

A system uses gossip messages that are transmitted via multicast to other host server computers to share when new sockets associated with a communication session are established. The gossip message can be used to create an association between a host identifier and an identifier of the communication session. When a network packet arrives, a host server computer can check which host server computer is associated with the communication session. If the communication session is associated with a different host server computer, it encapsulates the packet and transmits the packet to the appropriate host using the pre-computed header template. On the receiving end of this encapsulated packet, a kernel space removes then encapsulation and allows the network packet to be processed by the proper destination host server computer. The result is to ensure all network packets land on the host server computer associated with the communication session.

14 Claims, 10 Drawing Sheets

(56) References Cited

U.S. PATENT DOCUMENTS

| | | | |
|---|---|---|---|
| 2011/0317703 A1* | 12/2011 | Dunbar | H04L 61/2596 |
| | | | 370/392 |
| 2013/0201979 A1* | 8/2013 | Iyer | H04L 12/4679 |
| | | | 370/338 |
| 2015/0113172 A1* | 4/2015 | Johnson | H04L 67/75 |
| | | | 709/245 |
| 2017/0026468 A1* | 1/2017 | Kumar | H04L 69/28 |
| 2019/0166108 A1* | 5/2019 | Larson | G06F 16/951 |
| 2020/0150621 A1* | 5/2020 | Dean | G06F 16/9017 |
| 2021/0067577 A1* | 3/2021 | Shribman | G06F 16/9566 |

* cited by examiner

CONNECTION OWNERSHIP GOSSIP FOR NETWORK PACKET RE-ROUTING

BACKGROUND

For high-demand content, a content provider may receive content requests from a high volume of client computing devices that can strain the content provider's computing resources. For example, a requested Web page can be associated with a number of additional resources, such as images or videos, that are to be displayed with the Web page. The additional resources of the Web page are located by embedded resource identifiers, such as uniform resource locators ("URLs"). To satisfy a content request, the content provider provides data associated with the Web page and the data associated with the embedded resources.

Some content providers attempt to facilitate the delivery of requested content, such as Web pages and/or resources identified in Web pages, through the utilization of a content delivery network ("CDN") service provider. CDNs provide a globally distributed network of proxy servers that cache content (e.g., web videos) locally to consumers so as to increase a speed for downloading the content. For example, the CDN can maintain duplicates of content, such as on a server computer in America and a server computer in Europe in local distribution centers, each one of which is called a Point-of-Presence (POP). In this way, content can be distributed locally instead of having to traverse continents to receive data.

Some CDN service providers leverage Equal Cost Multi-Path (ECMP) routing in the POPs. ECMP is a stateless hash-based method of routing packets across multiple equal paths wherein each caching server acts as a next hop in the routing path. A problem occurs when servers are either added or removed from a pool of available servers in the POP. In such a case, the hashing function can misroute packets. Additionally, a TCP layer on the servers can misconstrue the packet as being at the correct destination, which can result in a dropped connection.

DETAILED DESCRIPTION

Load balancing in a network that uses ECMP sometimes directs packets to a wrong host server computer, especially when network changes occur, like when host server computers are taken offline or new host server computers are added. Under ECMP, when the host server computers change, hash entries in a routing table are also changed, which sometimes results in packets being transmitted to the wrong host. When a wrong host receives a packet, it can then sever the communication session with the client computer. The result is the client computer must re-establish the communication session, causing delay and disruption. In one embodiment, gossip messages can be transmitted to other host server computers to share when new sockets are established and when the sockets are closed. For example, each host server computer can maintain a current state of open sockets for host server computers in the POP. When a network packet arrives, a host server computer can check which host server computer is associated with the communication session. If the communication session is associated with a different host, it encapsulates the packet and transmits the packet to the appropriate host. On the receiving end of this encapsulated packet, a kernel space removes the encapsulation and allows the network packet to progress up the stack to be processed by the proper destination host server computer. The result is to ensure all network packets land on the host server computer associated with the communication session.

Figure 1:
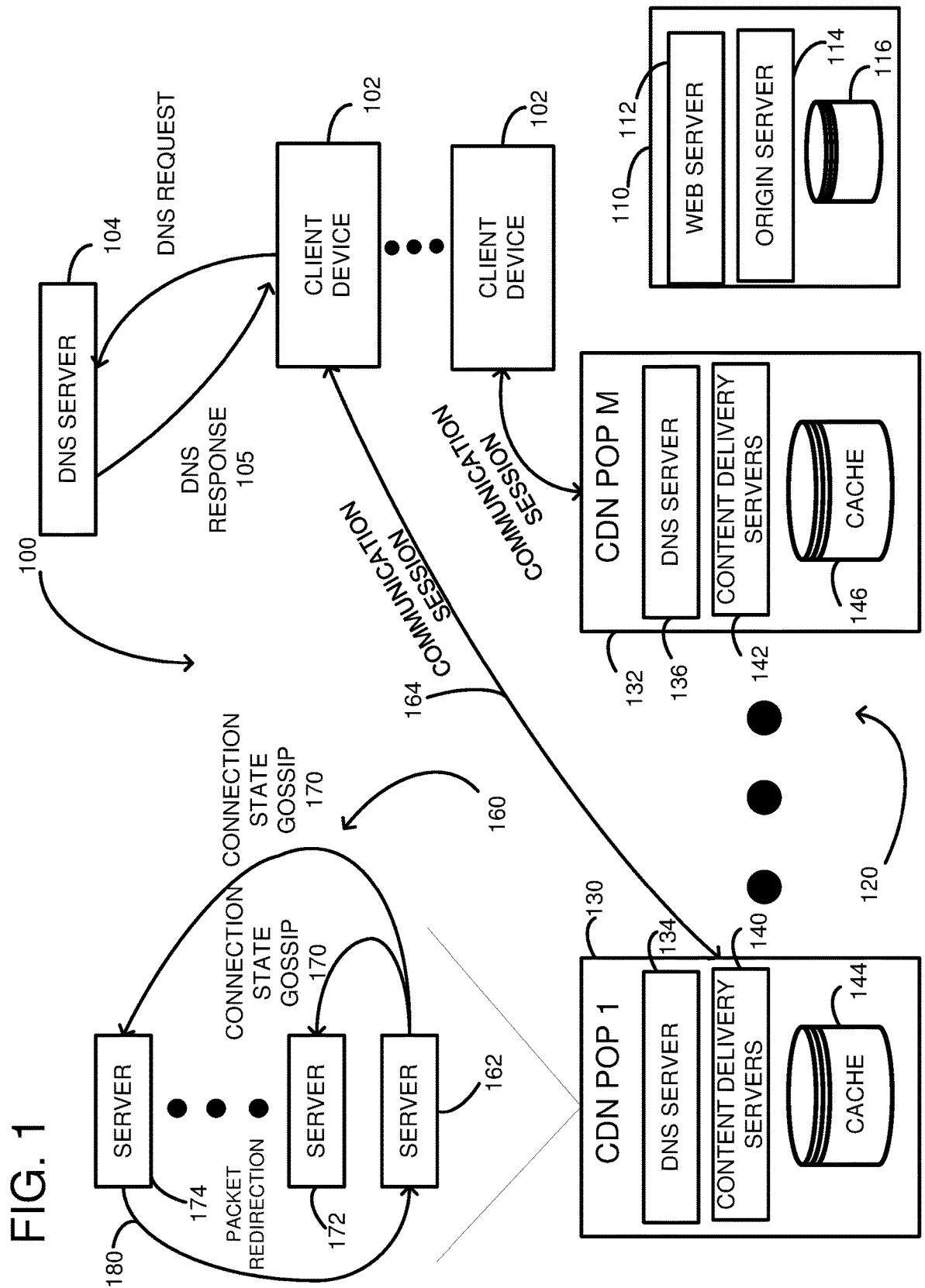
FIG. 1 is a system according to one embodiment including a content-delivery network (CDN) having multiple POPs with servers for gossiping connection state and packet re-distribution between host server computers.

FIG. 1 is an example of a content delivery environment 100 for the management of content storage and delivery. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. The client computing devices 102 include hardware and software components for establishing communications over a communication network (not shown), such as a wide area network or local area network.

Each client computing device 102 can communicate with a local DNS resolver component 104, such as a DNS Name server, that generates the DNS queries attributed to the client computer. For example, the local DNS resolver component 104 may belong to an enterprise network to which the client computer belongs. Alternatively, the local DNS resolver component 104 can belong to an Internet Service Provider (ISP) that provides the network connection to the client computer 102. In any event, the DNS server 104 can resolve the request to one address or multiple addresses, as shown at 105, for a same piece of content. The requestor can then use any one of the addresses to obtain the content.

The content delivery environment 100 can include a content provider 110 in communication with the one or more client computing devices 102. The content provider 110 can include a web server component 112 corresponding to one or more server computing devices for obtaining and processing requests for content (such as Web pages) from the client computing devices 102. The content provider 110 can further include an origin server component 114 and an associated storage component 116 for obtaining and processing requests for network resources. One skilled in the relevant art will appreciate that the content provider 110 can be associated with various additional computing resources, such as additional computing devices for administration of content and resources, DNS name servers, and the like.

The content delivery environment 100 can further include a CDN service provider, shown generally at 120, as including M (where M is any integer number) POP locations 130 (POP location 1) through 132 (POP location M). Each POP 130, 132 includes a DNS server 134, 136 for resolving DNS queries from the client computers 102. Each POP 130, 132 also includes a content delivery server 140, 142 and a resource cache component 144, 146 for storing objects from content providers and transmitting various requested objects to various client computers.

In the illustrative embodiment, the DNS servers 134, 136, the content delivery servers 140, 142 and the resource cache components 144, 146 are considered to be logically grouped, regardless of whether the components, or portions of the components, are physically separate. Additionally, the POPs 130, 132 are geographically distributed in a manner to best serve various demographics of client computing devices 102. For example, different POPs can be in different states or different countries to reduce latency of delivering content to a local requestor. In one example of how the content delivery environment works, when a local request is made for content, if it is not present in the cache 144 of POP 130, then the content delivery server 140 can request the content from the origin server 114. The content can then be delivered back to the requesting POP 130 and the content is stored locally in the cache 144. Future requests for the same content can be supplied from the cache in the local POP rather than having to pull the content from the origin server 114.

Further details of host server computers within POP 130 are shown at 160. A host server computer 162 establishes a communication session 164 with the client device 102, which results in a newly opened socket. As shown, a gossip message 170 is sent to all other host server computers 172, 174 (any number of host server computers can be included) in the POP. The gossip message can include an identifier of the host server computer 162 and an identifier of the communication session 164. The server computers 172, 174 can then create an association between the identifier of the host server computer and a connection identifier. The server computers 162, 172, 174 separately receive identifiers of all other server computers in the POP and use the identifiers to generate a predetermined header template to be used for packet redirection. For example, if server computer 174 receives a network packet associated with the communication session 164, it can determine that the communication session is associated with another server computer and transmit the network packet to the server computer 162, as shown at 180. As part of the transmission, the server computer 174 can encapsulate the network packet using the predetermined header template and transmit the encapsulated network packet to the server computer 162. In turn, the server computer 162 can receive the packet and remove the encapsulation to retrieve the original network packet. One advantage of the system is that the communication session 164 can remain established despite actively sending packets misrouted to server 174.

Figure 2:
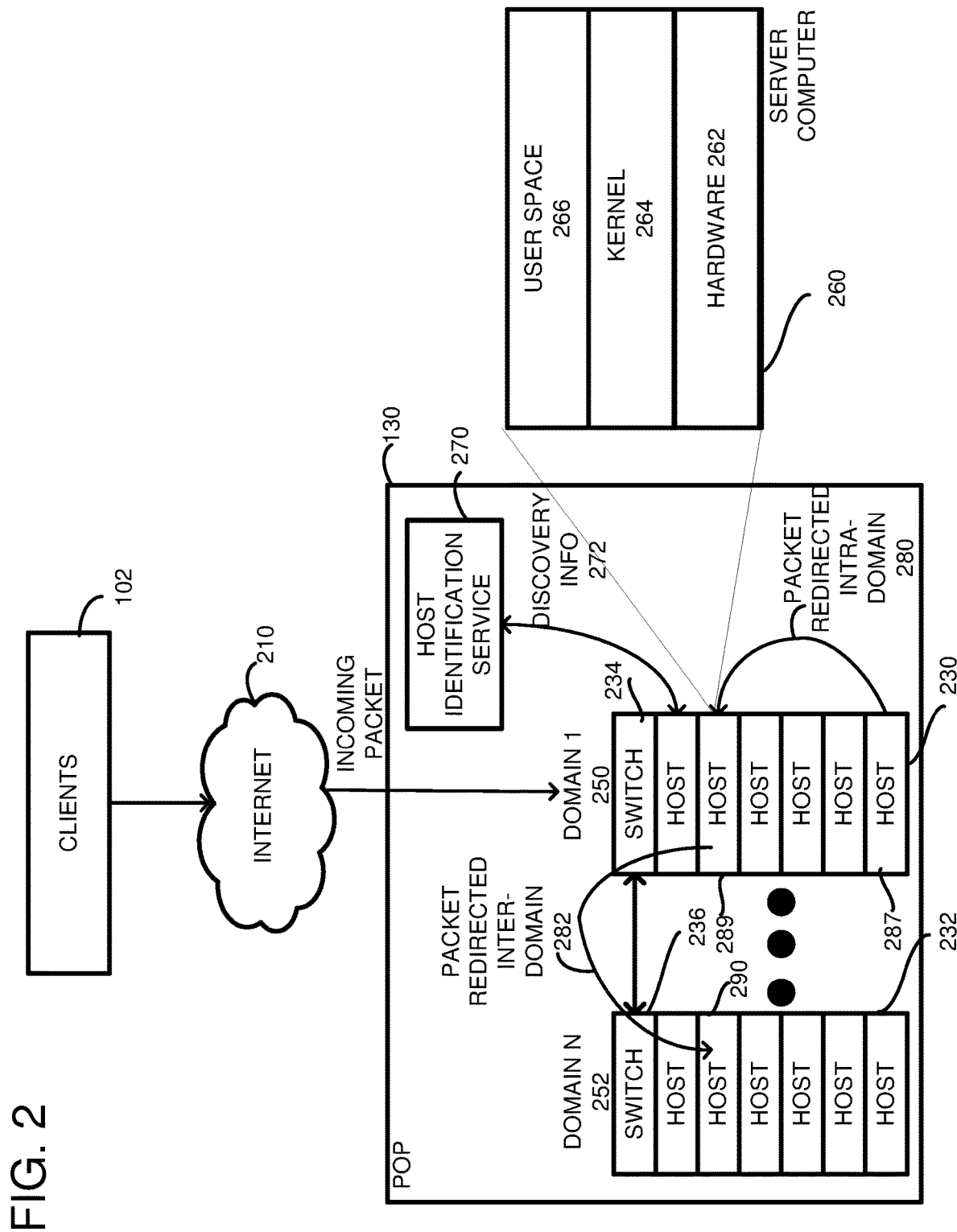
FIG. 2 is a system diagram showing further details of a POP with intra-domain packet re-distribution and inter-domain packet redistribution.

FIG. 2 provides further details of the POP 130 of FIG. 1. As shown, the client computers 102 are coupled to the POP 130 through the Internet 210. The POP 130 includes one or more racks of host server computers 230, 232. Each rack 230, 232 can include a switch 234, 236 (e.g., a top-of-rack switch) coupled to multiple host server computers. Each rack is a separate domain, shown as domain 1 (250) through domain N (252)(where N is any positive integer number). A particular host server computer 289 is shown in an expanded view at 260. The host 289 has underlying hardware 262 including one or more CPUs, memory, storage devices, etc. Running a layer above the hardware 262 is a kernel layer 264. A user space 266 is an application layer and any desired applications can be executing in conjunction with the kernel layer 264 and hardware 262.

A host identification service 270 can be coupled to the different racks 230, 232 and can perform health checks on the corresponding server computers. Through the health checks, discovery information 272 can be obtained including an identification (e.g., an IP address) of each host server computer in the POP 130. The discovery information 272 can be shared with the host server computers such that each host server computer knows the identification of all other active host server computers in the POP. Such identification information from the host identification service 270 can be used to generate pre-computed header templates. As described further below, an intra-domain redirected packet 280 is treated differently than an inter-domain redirected packet 282. More specifically, the header information used to encapsulate the intra-domain packet 280 is a multicast message, whereas the header information used to encapsulate the inter-domain message 282 is a point-to-point message using a MAC address of a gateway between the two switches 234, 236. In the inter-domain communication 282, a packet can be transmitted from the first host server computer 289, via the gateway associated with switches 234, 252, to a second host server computer 290. The intra-domain packet redirection 280 can be accomplished by a first host server computer 287 transmitting to the second host server computer 289 in the same domain. Such a communication can pass via the switch 234.

Figure 3:
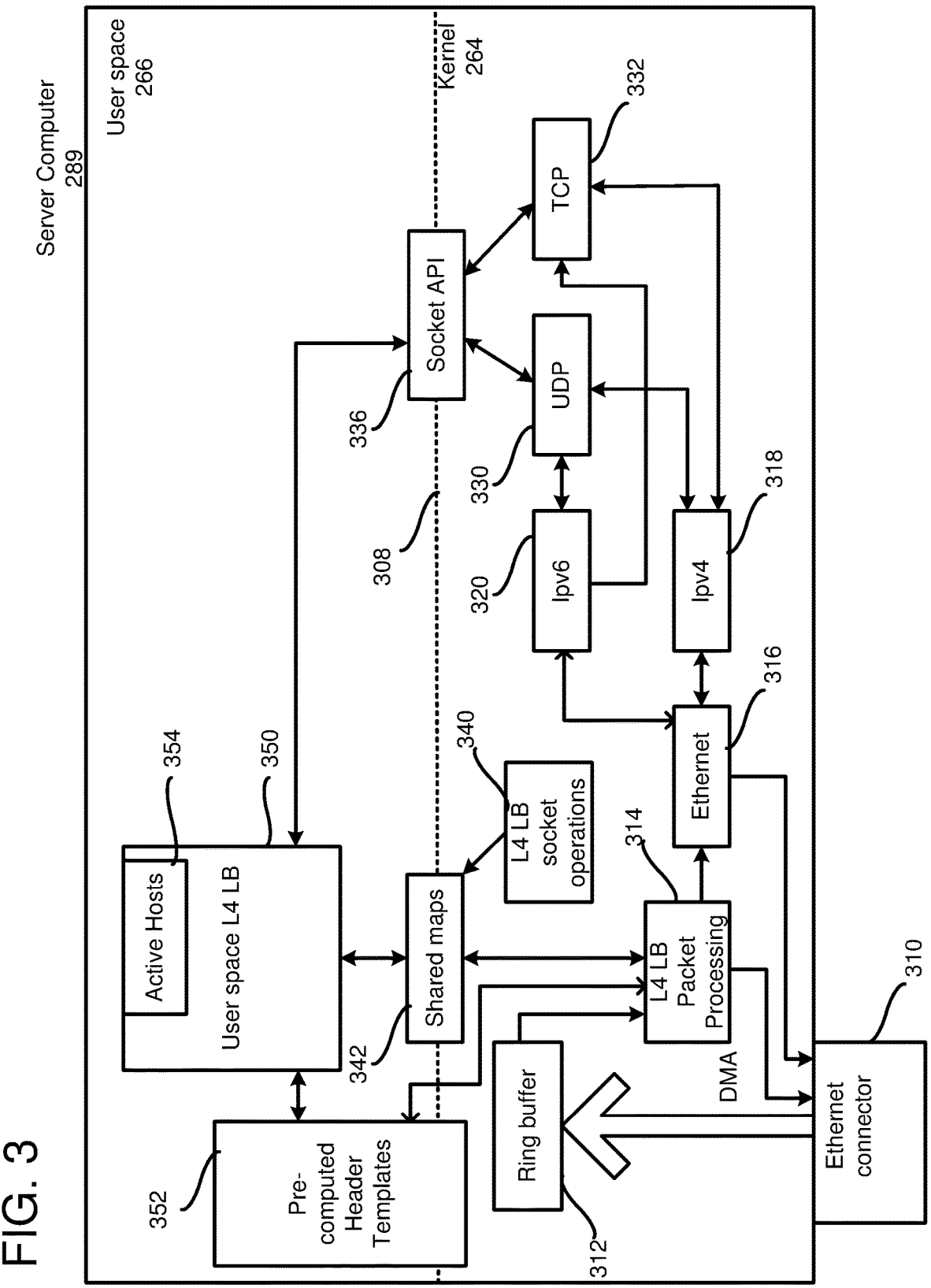
FIG. 3 shows details of a host server computer that generates a pre-computed header template based upon a gossip message related to a connection state.

FIG. 3 shows further details of the server computer 289 including the kernel layer 264 and the user space layer 266, with a line 308 showing which layer various modules are located. The server computer 289 is connected to a network through an interface, such as an Ethernet connector 310. Other interfaces can be used. Received packets from the Ethernet connector 310 can be stored in a ring buffer 312. A layer 4 load balancing (L4 LB) module 314 can retrieve network packets out of the ring buffer and make a decision whether the packet is to be processed in the server computer 289. If so, the network packet is passed through the Ethernet module 316, which assesses whether the packet is to be passed to the IPv4 module 318 or the IPv6 module 320, based on a version of Internet Protocol being used. Then, the packet passes to a User Datagram Protocol (UDP) module 330 or a Transmission Control Protocol (TCP) module 332 based upon the protocol used. Finally, a socket API 336 receives the packet and decides whether the packet is a start of a new communication session. If so, then an event is generated that a new socket has been created. A L4 LB socket operations module 340 stores the socket event in a shared maps memory area 342. A user space L4 LB application 350 receives the event from the shared maps 342 and generates a gossip message sent to all other active server computers. The gossip message includes an identifier (e.g., IP address) of the server computer 289 and an indication that it has opened a new communication session, including an identifier of the communication session. In order to transmit the gossip message, the server computer 289 stores information associated with all active hosts in an active host storage 354, wherein the information received and updated from the host identification service 270 (FIG. 2). The active hosts storage 354 can allow for lookups of a host ID using an IP address. Other hosts are also transmitting gossip messages. When a gossip message is received in the host server 289 from a sending host server computer, the information associated with the gossip message is passed through the shared maps 342 to the user space application 350. The gossip message can be used to ensure a host ID and a connection ID are associated together. The user space application 350 can also generate a pre-computed header template 352 using the active hosts data 354. The pre-computed header templates are accessible to the user space L4 LB 350 and the L4 LB packet processing 314. The pre-computed header templates 352 can also be considered as a shared map, but the shared map area 342 is more generic. To generate the pre-computed header template, the following information is used: the destination MAC (remote host), the source MAC (local host), the source IP (local host) and the destination IP (remote host). Each of these values can be part of the pre-computed header template 352. Additionally, the user space application 350 determines which broadcast domain the sending host server computer associated with the received gossip message is located. If the sending host server computer is in a same domain with host server 289, then the pre-computed header template can include a MAC address for the sending host and an IP address of the sending host, which can be used to encapsulate any received packet by concatenating the pre-computed header template on a header of a received packet. If the sending host server computer is within a different domain, then the pre-computed header template can include a MAC address for a gateway to another domain that includes the sending host server computer. The pre-computed header templates 352 can be retrieved using the host ID as a key, wherein the host ID is obtained from the active hosts storage 354. When a communication session is closed, the L4 LB socket operations 340 receives a new gossip message related to the closure.

By way of example, when a network packet is erroneously received by the server computer 289, which is meant for a different server computer, the server computer 289 uses the IP address in the header of the network packet to lookup the active hosts 354 and obtain a host ID. The host ID is then used to lookup the pre-computed header template 352 used to re-direct the network packet to the appropriate host server computer, rather than terminating the connection. The pre-computed header template can be used as a tunneling header including IP-in-IP encapsulation. The general format includes an Ethernet header, an outer IPv4 or IPv6 header and an inner IP header. The host server computer receiving the packet can remove the tunneling header and retrieve the original network packet.

Figure 4:
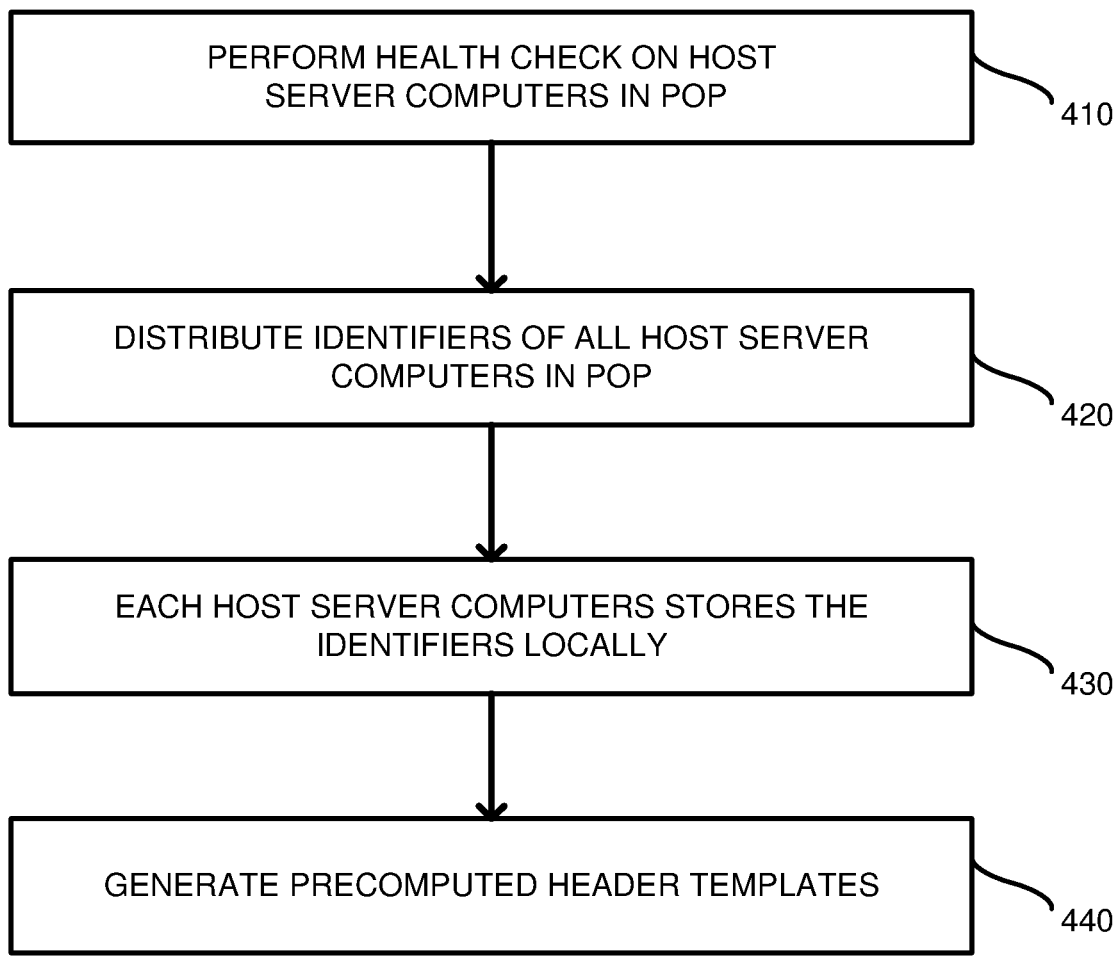
FIG. 4 is a flowchart according to one embodiment for identifying host server computers available on a POP.

FIG. 4 is a flowchart according to one embodiment for detecting host server computers. In process block 410, a health check is performed on host server computers in a POP. For example, the host identification service 270 (FIG. 2) can be used to send a message to each host server computer in the POP 130 to ensure that it is active. In process block 420, identifiers of all the active host server computers in the POP can be distributed so that every host server computer has an IP address of all other active host server computers. In process block 430, each host server computer stores the IP addresses of the other host server computers locally. For example, in FIG. 3, the active hosts are shown stored at 354. Additionally, an identifier of the host, different than the IP address, can be assigned to the host, such as a number between 0 and 255.

The identifier can then be used to lookup the pre-computed header templates 352. In process block 440, the host identifiers can be used to generate the pre-computed header templates. For example, in FIG. 3, once the active hosts 354 are received, the user space L4 LB 350 can generate the pre-computed header templates 352, which is usable by the L4 LB packet processing 314 to redirect packets to the proper server computer.

Figure 5:
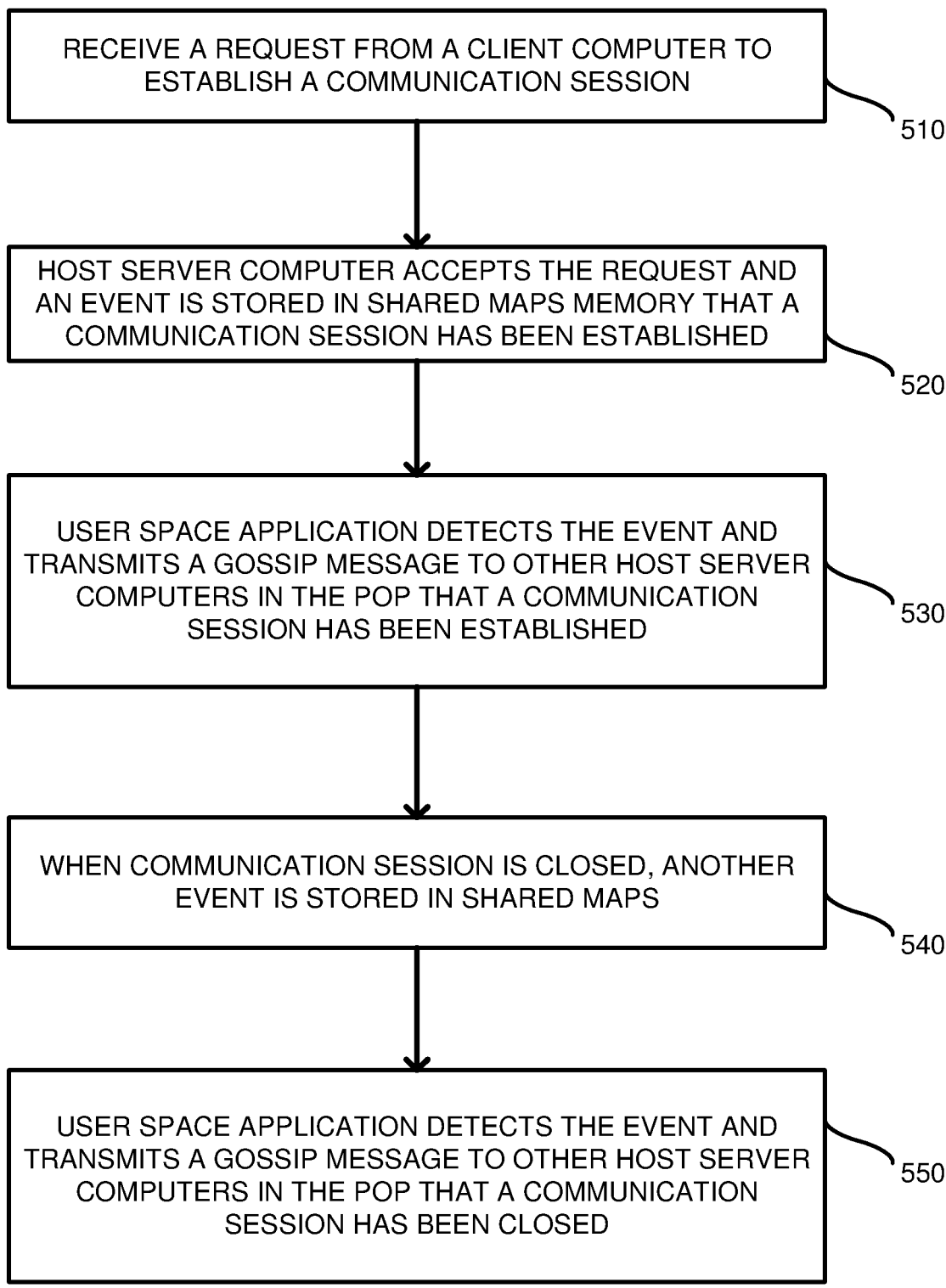
FIG. 5 is a flowchart according to one embodiment for generating gossip messages.

FIG. 5 is a flowchart according to another embodiment for generating a gossip message. In process block 510, a request is received from a client computer to establish a communication session. For example, in FIG. 2, a client computer 102 can request a communication session with host computer 289. As a result of the request, a socket can be opened on the host server computer 289. In process block 520, the host server computer can accept the request and store an event in a shared maps memory that a communication session has been established. For example, in FIG. 3, once a socket is opened, the L4 LB socket operations 340 can store the event in the shared maps 342 for consumption by the user space 266. In process block 530, the user space application detects the event and transmits a gossip message to the other host server computers in the POP. The gossip message includes a confirmation that a communication session has been established. For example, in FIG. 3, the user space L4 LB 350 can read the event from the shared maps 342 and transmit a gossip message to all hosts found in the active hosts storage 354. In process block 540, when the communication session closes, another event is stored in the shared maps. For example, in FIG. 3, the L4 LB socket operations 340 can store the socket closure event in the shared maps 342. In process block 550, the user space L4 LB application 350 detects the event and transmits another gossip message to the other host server computers in the POP that the communication session has been closed. For example, in FIG. 3, the user space application 350 can transmit the gossip message indicating that the socket has been closed to all hosts listed in the active host memory 354.

Figure 6:
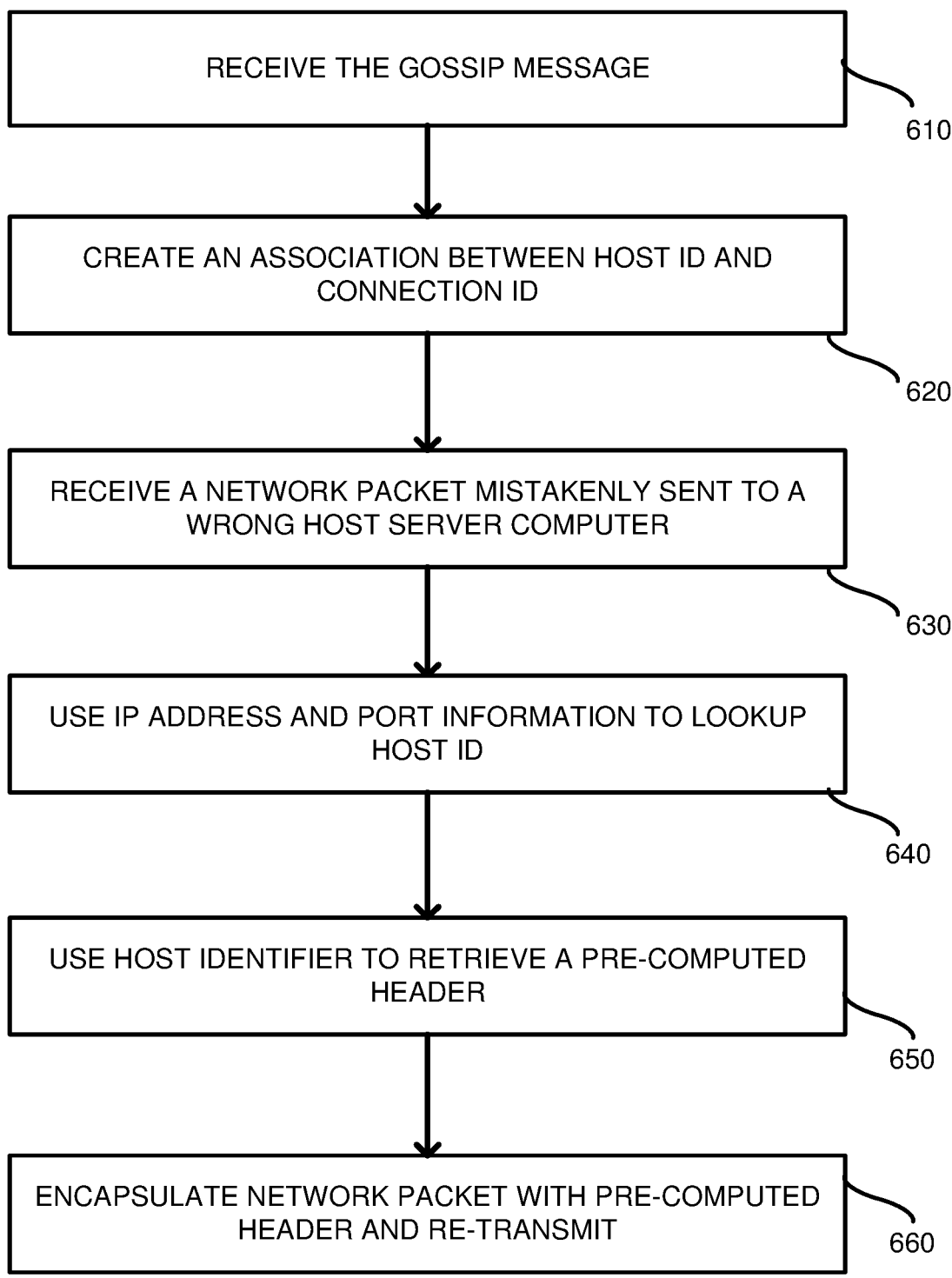
FIG. 6 is a flowchart according to one embodiment for receiving a gossip message, generating a pre-computed header and using the header to re-direct a network packet.

FIG. 6 is a flowchart according to another embodiment from the perspective of a host server computer receiving a gossip message. In process block 610, a gossip message is received by a host server computer. For example, in FIG. 3, the L4 LB socket operations 340 can store in shared maps that a communication session was opened on a different host server computer. In process block 620, an association is created between a host identifier and a connection identifier associated with the communication session. Such an association allows the system to protect against an ECMP reshuffling that occurs when a host server computer is taken offline, which can result in a hashing algorithm to switch host IDs. By saving the association between the host ID and the connection ID, the correct host ID can be retrieved. In process block 630, a network packet is mistakenly received in a host server computer. Specifically, the network packet is associated with a communication session established by a different host server computer. In FIG. 3, such a detection can be made by the L4 LB packet processing 314, which can alert the user space L4 LB application 350. In process block 640, an IP address and port information can be used to lookup the host ID. For example, in FIG. 3, the user space L4 LB application can lookup a host ID in the active hosts storage 354. In process block 650, the host ID is used to retrieve the pre-computed header. For example, in FIG. 3, the user space L4 LB application 350 can use the host ID as a key to lookup the pre-computed header template 352. Finally, in process block 660, the network packet can be encapsulated using the pre-computed header and retransmitted to the proper host server computer destination. Thus, packets incorrectly received in a host server computer can be retransmitted from the host server computer to the proper destination server computer.

Figure 7:
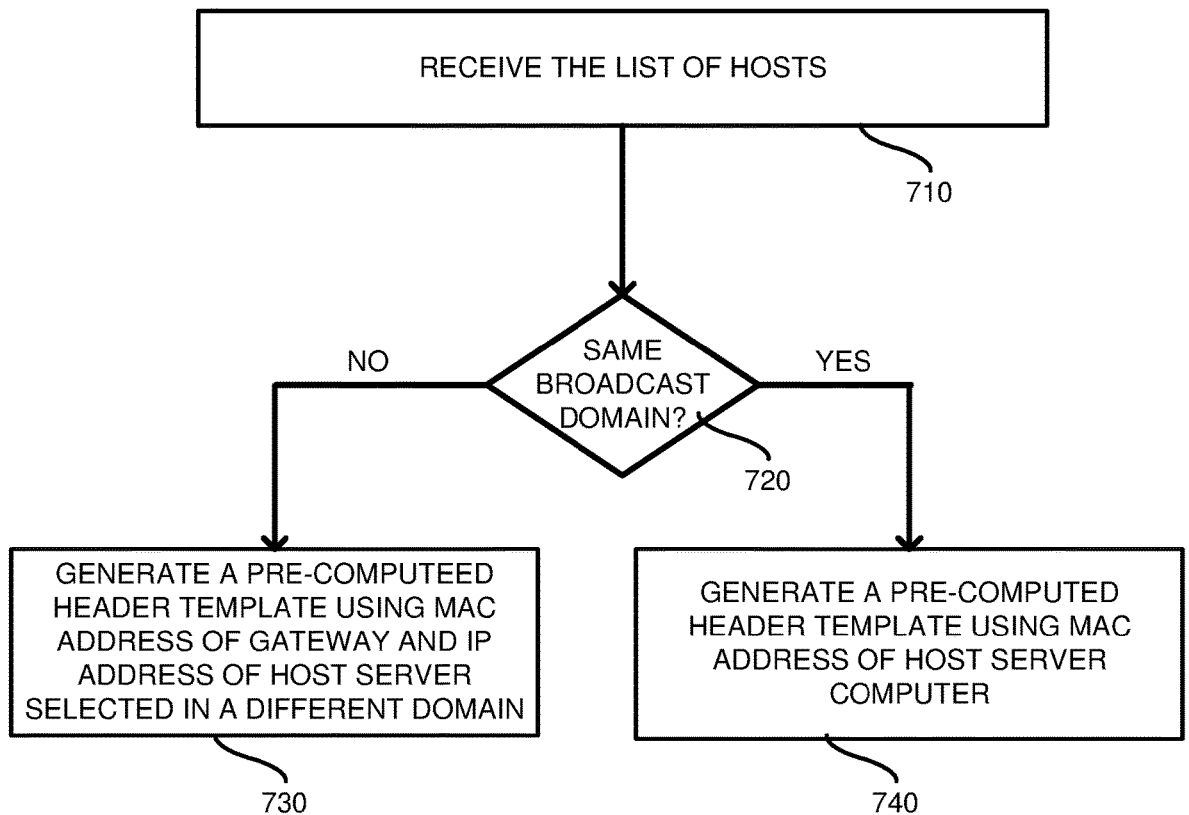
FIG. 7 is a flowchart according to one embodiment wherein a pre-computed header template is generated differently based on a network domain.

FIG. 7 is a flowchart according to another embodiment for generating the pre-computed header template when there are multiple domains. In process block 710, a list of host server computers is received, such as from the host identification service 270 (FIG. 2). In decision block 720, a check can be made whether the second host is within the same domain as the first host. Such a determination can be made using the active hosts data 354 (FIG. 3). If not, then in process block 730, the pre-computed header template can be generated using a MAC address of a gateway and the IP address of a selected host server computer in the other domain. For example, in FIG. 2, a MAC address of a gateway associated with the switch 234 can be used. Additionally, a host computer 290 can be selected in the domain N 252, despite that the destination computer is host 294. Such a header can be used for inter-domain redirections 282 (FIG. 2). If process block 720 is answered in the affirmative, then at process block 740, the pre-computed header template can be generated using a MAC address of the second host server computer and the IP address of the second host server computer. Such a template can be used for intra-domain 280 redirections.

Figure 8:
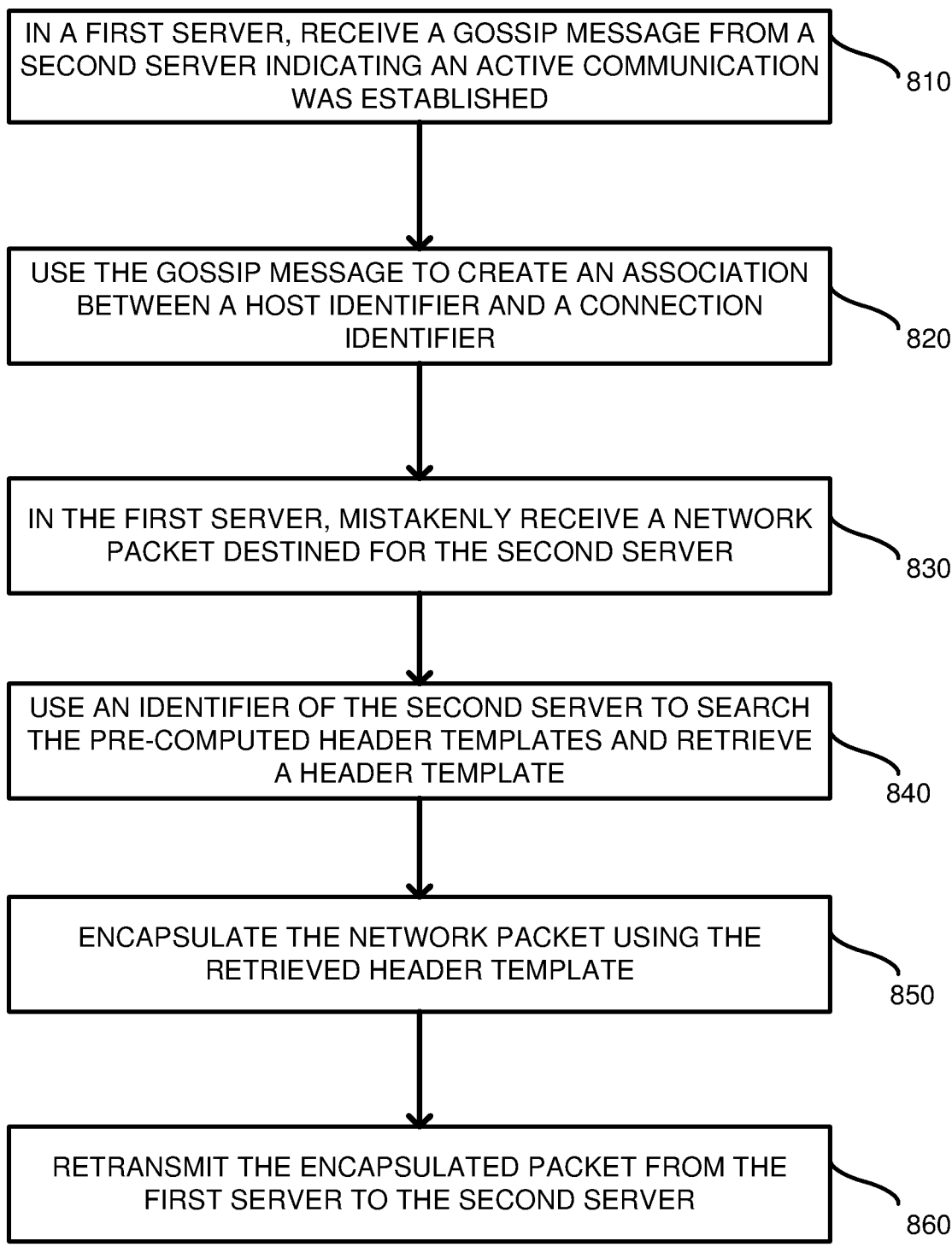
FIG. 8 is a flowchart according to one embodiment for re-directing network traffic between host server computers.

FIG. 8 is a flowchart according to one embodiment for redirecting a network packet. In process block 810, a first server computer receives a gossip message from a second server computer that a communication session was established. For example, in FIG. 2, the first server computer can be host 287 and the second server computer can be the host 289. In process block 820, the gossip message is used to create an association between a host identifier and a connection identifier. In process block 830, in the first server computer, a network packet is mistakenly received that was supposed to be delivered to the second server computer. Thus, in FIG. 2, the host 287 receives a packet that was supposed to be sent to host 289. In process block 840, an identifier of the second host server computer can be used to search the pre-computed header templates and retrieve a header template associated with the second server computer. To obtain the identifier of the second host server computer, an address and port number from the packet can be used. In process block 850, the header template can be used to encapsulate the network packet. And finally, in process block 860, the encapsulated packet having the proper IP address and MAC address of the second server computer, can be transmitted to the second server computer. For example, in FIG. 2, the host 287 can transmit the encapsulated packet to the host 289, as shown at 280.

Figure 9:
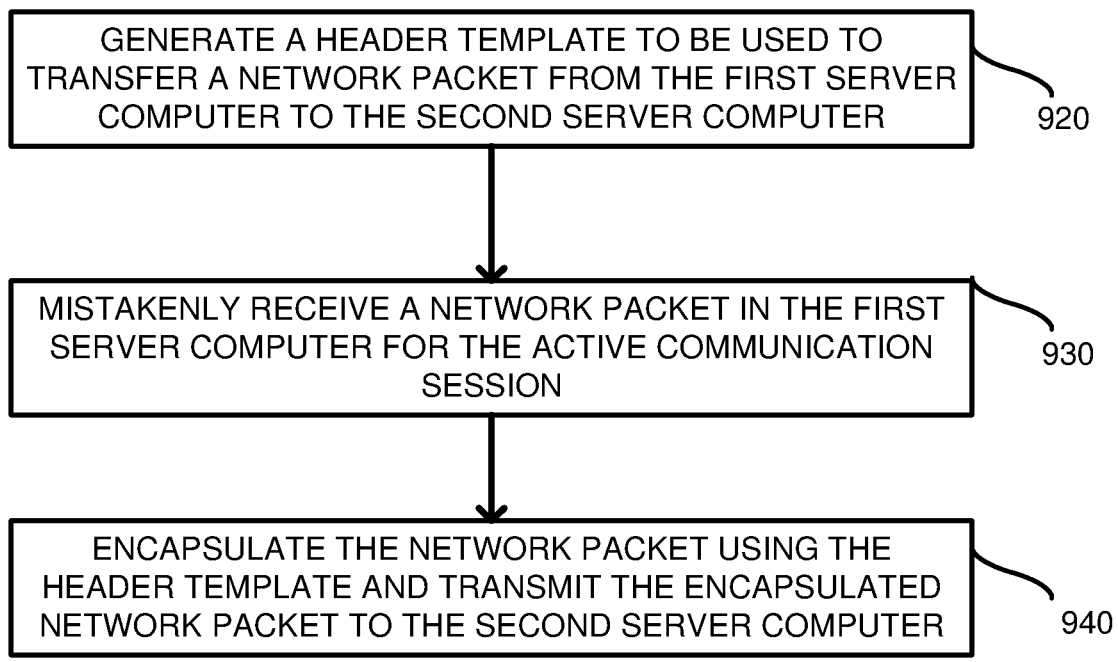
FIG. 9 is a flowchart according to another embodiment for re-directing network traffic between host server computers.

FIG. 9 is a method according to another embodiment for redirecting network traffic between two host server computers. In process block 920, a header template is generated to be used to transfer a network packet from a first server computer to a second server computer. In process block 930, a network packet is mistakenly received in the first server computer for an active communication session. For example, the host 289 can receive a network packet for the communication session between the client computer 102 and the host 294. In process block 940, the header template is used to encapsulate the network packet and transmit the encapsulated network packet to the second server computer.

For example, in FIG. 2, the host 289 can encapsulate the received packet and send it to the host 294 as a final destination.

Figure 10:
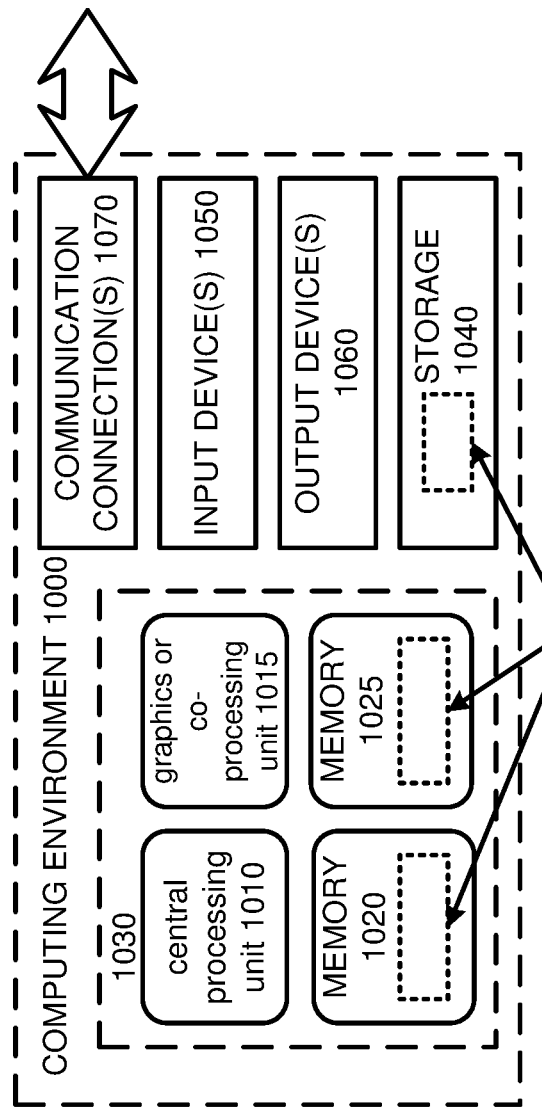
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, the software 1080 can be the user space L4 LB application 350 (FIG. 3).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of redirecting network traffic, the method comprising:
    in a first host server computer, receiving a gossip message from a second host server computer, wherein the gossip message indicates that the second host server computer established an active communication session having a connection identifier;
    using the gossip message, creating an association between a host identifier of the second host server computer and the connection identifier;
    receiving a network packet in the first host server computer, but destined for the second host server computer;
    using an address and a port associated with the network packet to obtain the host identifier;
    using the host identifier of the second host server computer to search within a list of pre-computed header templates and retrieving a corresponding header template;
    encapsulating the network packet using the retrieved header template; and
    retransmitting the encapsulated network packet from the first host server computer to the second host server computer.

2. The method of claim 1, further including determining that the second host server computer is in a same broadcast domain as the first host server computer and transmitting the network packet directly to a network switch for redirecting the encapsulated network packet to the second host server computer.

3. The method of claim 1, further including determining that the second host server computer is in a different broadcast domain than the first host server computer, and using a MAC address of a gateway to retransmit the network packet from the first host server computer to the second host server computer.

4. The method of claim 3, wherein the first host server computer retransmits the encapsulated network packet without using a multicast message.

5. The method of claim 1, wherein the second host server computer removes the header template from the encapsulated network packet to obtain the network packet.

6. A method, comprising:
    generating a header template on the first host server computer to be used to transfer a network packet from the first host server computer to the second host server computer;
    mistakenly receiving, in the first host server computer, a network packet from a client computer; and in the first host server computer, encapsulating the network packet using the header template and transmitting the encapsulated network packet to the second host server computer.

7. The method of claim 6, further including transmitting a gossip message from the second host server computer to all other host server computers in a Point-of-Presence (POP), the gossip message indicating that the second host server computer opened an active communication session with the client computer.

8. The method of claim 6, wherein the generating of the header template includes determining whether the second host server computer is in a same network domain as the first host server computer or in a different network domain and generating the header template differently based on the determination.

9. The method of claim 8, wherein if the second host server computer is in the different network domain than the first host server computer, then using a MAC address of a gateway to generate the header template.

10. The method of claim 6, further including receiving the encapsulated network packet in the second host server computer and removing the header template to obtain the network packet.

11. The method of claim 6, further including receiving, in the first host server computer, a message indicating that the second host server computer closed the active communication session with the client computer and remove an association between the second host server computer and an active communication session.

12. The method of claim 6, wherein the generating of the header template occurs at an application layer of the first host server computer.

13. The method of claim 6, wherein the encapsulating the network packet includes using an address and a port in the network packet as a lookup key to obtain an identifier associated with the second host server computer, then using the identifier as a lookup key to obtain the header template.

14. The method of claim 6, wherein a shared memory space is used by both a kernel layer and an application layer on the first host server computer, and wherein the shared memory space is used to pass events to the application layer, the events including that the second host server computer opened an active communication session.

* * * * *